July 30, 1957  S. LUBKIN  2,801,344
MAGNETIC GATING CIRCUIT
Filed Nov. 29, 1954  2 Sheets-Sheet 1

INVENTOR.
SAMUEL LUBKIN
BY S.C. Yuter
ATTORNEY

INVENTOR.
SAMUEL LUBKIN

United States Patent Office 2,801,344
Patented July 30, 1957

2,801,344
MAGNETIC GATING CIRCUIT

Samuel Lubkin, Bayside, N. Y., assignor to Underwood Corporation, New York, N. Y., a corporation of Delaware Application November 29, 1954, Serial No. 471,799

16 Claims. (Cl. 307—88)

This invention relates to gating circuits and more particularly to gating circuits which employ magnetic core binary elements.

A magnetic core binary element may have, after being initially subject to a magnetomotive force, two stable states each represented by a particular residual magnetic flux direction. These two states are termed the set or one state and the reset or zero state. The magnetic core may be changed or flipped from one state to the other by applying an impulse or appropriate polarity to induce a magnetomotive force which changes the residual flux direction.

Magnetic cores of this type, with suitable coil windings, have been employed as elements to pass input pulses in the presence of gating pulses. For example, two pulses of the same polarity may be gated by applying each pulse to a separate winding such that the combined magnetomotive force is sufficient to cause a change of direction of the flux in the core. However, the presence of only one of the pulses does not flip the magnetic core. The change of state or condition of the core is utilized to generate an output pulse at an output winding. The output pulse indicates the simultaneous presence of the input and gating pulses.

Another type of gating circuit employs two loops of magnetic material having a common portion such that an input pulse of a given polarity, which is fed to a winding on the common portion, produces a flux change in one direction in one loop and a flux change in the opposite direction in the other loop. A gating pulse is employed to drive the loops to saturation so that a sufficiently large signal is generated in an associated output winding when the flux density changes due to the receipt of an input pulse. However, this type of gating circuit requires the input pulses to always be of the same polarity. In other words, if the gate circuit is designed for input pulses of positive polarity, it will not be responsive to input pulses of the opposite or negative polarity.

The same inability to be equally responsive to both positive and negative pulses is present in the magnetic gating circuits which utilize only one magnetic core.

Therefore, an object of the invention is to provide an improved magnetic gating circuit.

Another object of the invention is to provide a gating circuit which is equally responsive to both positive and negative pulses.

A further object of the invention is to provide a gating circuit which will indicate the presence of a positive input pulse or a negative input pulse by an output pulse of a given polarity.

Still another object of the invention is to provide a magnetic core gating circuit which produces a positive output pulse when an input pulse of either polarity is present simultaneously with a gating pulse.

In accordance with the preferred embodiment of the invention, a magnetic gating circuit is provided to pass a positive or a negative input pulse in the presence of a gating pulse. The magnetic gating circuit comprises first and second magnetic cores each having an input, a gating and an output winding. The first magnetic core is always in a negative saturated flux condition and the second magnetic core is always in a positive saturated flux condition in the absence of gating pulses. The gating windings, in the absence of gating pulses, prevent either of the magnetic cores from changing condition. In the presence of a gating pulse (which allows either of the magnetic cores to change condition), a negative input pulse will flip the first magnetic core to a positive flux or set condition and not affect the state of the second core. The second core is flipped to the negative flux or reset condition and the first magnetic core is unaffected when a positive input pulse is received together with a gating pulse. The output windings are arranged so that the change of state of either magnetic core will generate a positive output pulse.

A feature of the invention is the maintaining of each of the magnetic cores in a saturated rather than residual flux condition in the absence of gating pulses.

An advantage of the invention is that the magnetic core material may have a characteristic curve which departs from the generally rectangular shape required by other magnetic materials which are utilized for gating circuits since the saturated rather than the residual flux properties of the magnetic material are utilized. This advantage accrues from the fact that magnetic materials having rectangular characteristics are more expensive than those with less rectangular characteristics.

Other objects, features and advantages of the invention will become apparent from consideration of the following detailed description which is accompanied by a drawing wherein.

Figure 1:
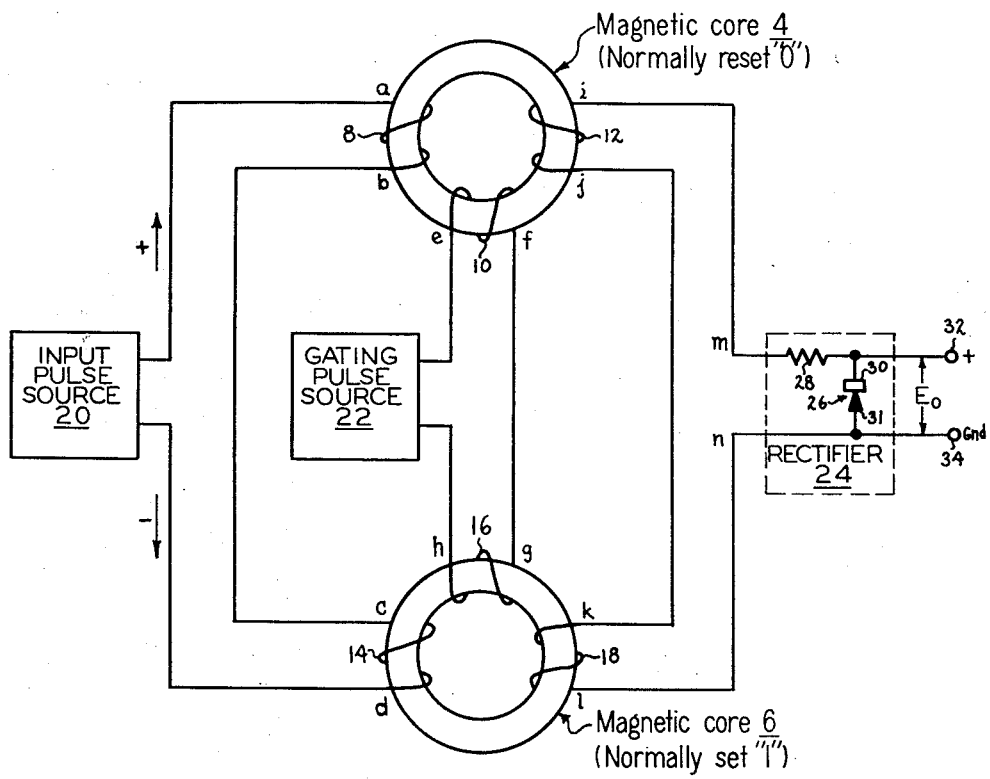
Fig. 1 is a schematic diagram of an impulse responsive circuit employing magnetic core binary elements in accordance with the preferred embodiment of the invention.

The magnetic gating circuit in accordance with the preferred embodiment of the invention is shown in Fig. 1. The magnetic gating circuit comprises the magnetic cores 4 and 6 and their associated windings. The magnetic core 4 has an input winding 8, a gating winding 10 and an output winding 12. The magnetic core 6 is provided with an input winding 14, a gating winding 16 and an output winding 18.

The input windings 8 and 14 are connected in series aiding relationship and are coupled to the input pulse source 20. The gating windings 10 and 16 are connected in series opposing relation and are coupled to the gating pulse source 22. The output windings 12 and 18 are connected in series opposing relationship and are coupled to the rectifier 24.

The rectifier 24 comprises the diode 26 and the resistor 28. The resistor 28 connects the outside end of the output winding 12 to the output terminal 32. The outside end of the output winding 18 is coupled to the negative output terminal 34 which may be connected to ground. The diode 26 consists of the cathode 30 and the anode 31. The cathode 30 is connected to the positive output terminal 32 and the anode 31 is connected to the negative output terminal 34.

The magnetic cores 4 and 6 are constructed from ferrite which has been especially processed to have generally rectangular hysteresis characteristics. However, as will be apparent hereinafter, it is not necessary to have a material with a rectangular characteristic since only the positive and negative saturated flux states of the material are utilized in accordance with the invention.

Figure 2:
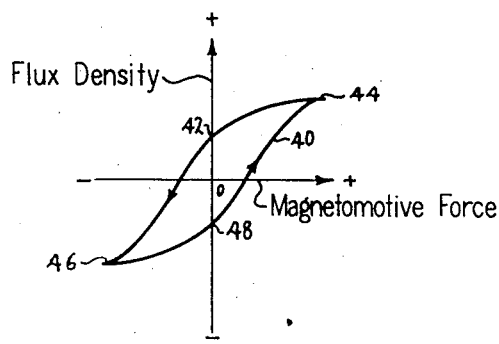
Fig. 2 is a curve illustrating a characteristic of the magnetic core material.

The characteristic curve 40 shown in Fig. 2 is a hysteresis loop of a satisfactory magnetic core material. A magnetic core of this material may have (after it has been initially subject to a magnetomotive force) one of two residual magnetomotive flux directions in the absence of an applied magnetomotive force. It will be assumed that the magnetic core is initially in a reset state, thus having a negative residual flux direction. When a magnetomotive force having a positive direction is applied to the magnetic core, the flux density will increase in a positive direction to the positive saturation flux condition at point 44. After the magnetomotive force is removed, the flux density will return to the positive residual flux point 42. When a magnetomotive force in the opposite or negative direction is applied to the core, the flux density is driven in a negative direction to the negative saturation point 46, and returns to the negative residual flux point 48 after the magnetomotive force is removed.

It will be assumed that the coil winding 8 is wound such that a positive (clockwise) magnetomotive force will be induced in magnetic core 4 when a negative pulse is present, and that a negative (counterclockwise) magnetomotive force will be induced when a positive pulse is present. Similarly, the input winding 14 of the magnetic core 6 is wound to induce a positive (clockwise) magnetomotive force when a negative pulse is present, and a negative (counterclockwise) magnetomotive force when a positive pulse appears.

The operation of the magnetic gating circuit shown in Fig. 1 will be described in connection with the current, flux and voltage curves of Fig. 3.

Figure 3:
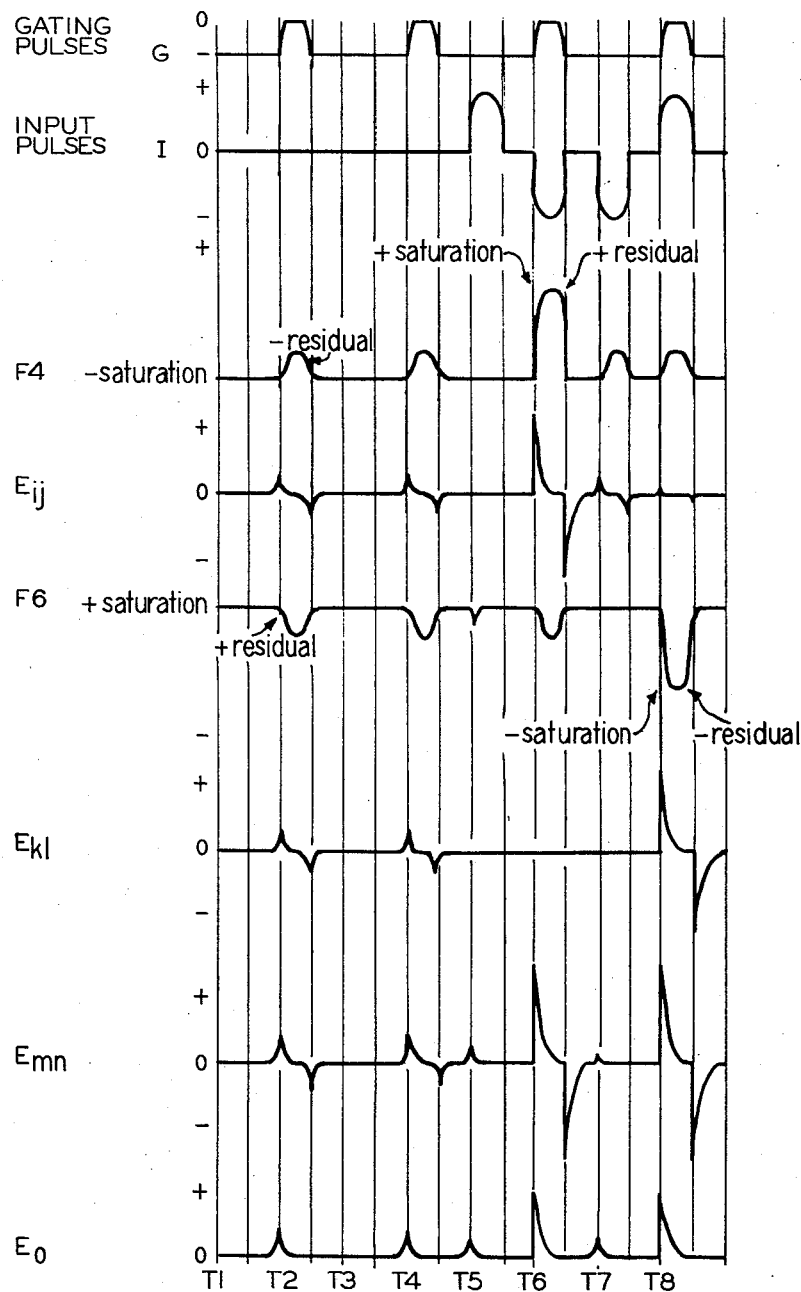
Fig. 3 is a series of curves drawn on a common time scale which illustrates the operation of the magnetic gating circuit shown in Fig. 1.

The gating pulse source 22 is selected to provide a series of pulses having a twenty-five percent duty cycle as illustrated on line G of Fig. 3. The gating pulses swing from a negative voltage level to ground potential so that when a gating pulse is absent (see Fig. 1), current flows from point $f$ to point $e$ in the gating winding 10, and from point $h$ to point $g$ in the gating winding 16. In the presence of a gating pulse, the current flow is reduced to zero. Therefore, between gating pulses the current which flows through gating winding 10 produces a magnetomotive force which drives the flux in a negative or counterclockwise direction in the magnetic core 4. The current is sufficient to flip the magnetic core 4 to the negative saturated flux condition, hereinafter termed the reset or zero state, so that the magnetic core 4 is normally in a reset state between gating pulses. This reset state in the absence of gating pulses is to be distinguished from the stable state which corresponds to the negative residual flux condition after the magnetomotive force is removed.

Similarly, between gating pulses the current which flows in the gating winding 16 produces a magnetomotive force which drives the flux in the magnetic core 6 in a positive clockwise direction. The current is great enough to drive the magnetic condition of the magnetic core 6 to the positive saturation flux condition, hereinafter called the set or one state. It should be noted that in the absence of gating pulses the reset or one state corresponds to the positive saturation flux condition rather than the positive residual flux condition.

Therefore, the magnetic core 4 is normally in a reset condition and the magnetic core 6 is normally in a set condition in the absence of gating pulses. Moreover, when a gating pulse is present at the gating windings 10 and 16, the gating pulse enables one of the magnetic cores 4 and 6 to change condition if an input signal is present at the input windings 8 and 14, since the presence of the gating pulse removes the magnetomotive force produced by the absence of gating pulses and thus permits each of the magnetic cores 4 and 6 to return to the residual flux condition. However, if a gating pulse is absent when an input pulse is received, the current flowing in the gating windings, which tends to drive each of the magnetic cores 4 and 6 to the saturated flux condition, will prevent either magnetic core 4 or 6 from flipping.

The input winding 8 is wound so that when a negative input pulse is received from the input pulse source 20 the current which is induced produces a magnetomotive force which drives the flux in the magnetic core 4 in a positive or set direction. However, as explained above, if a gating pulse is absent at the gating winding 10, the input pulse is not of sufficient magnitude to produce a current which changes the state of the magnetic core 4. If a gating pulse is present when a negative input pulse is received, the magnetic core 4 will flip to a set condition. Thereafter the magnetic core 4 is reset when the gating pulse disappears due to a resumption of the current through the gating winding 10.

When a positive pulse is fed from the input pulse source 20 it produces a current in the input winding 14 which induces a magnetomotive force which drives the flux in a negative direction, tending to reset the magnetic core 6. However, in the absence of a gating pulse at the gating winding 16, the current induced in the input winding 14 will not be sufficient to flip the magnetic core 6 so that it remains in a set state. However, when a gating pulse is fed to the magnetic core 6 simultaneously with a positive input pulse the magnetic core 6 will reset, and will only return to the set condition at the termination of the gating and input pulses.

Referring to the magnetic gate circuit shown in Fig. 1 and to the wave forms illustrated in Fig. 3, the operation of the magnetic gating circuit will be described in connection with the input pulses shown on line I of Fig. 3.

At time T1 neither an input pulse nor a gating pulse is present. Therefore, the flux in magnetic core 4 (see line F4) is in a negative or reset condition. The flux in the magnetic core 6 (see line F6) is in a positive or set condition. At time T2 a gating pulse is fed to the gating circuit and drives the flux in the magnetic core 4 slightly positive and the flux in the magnetic core 6 slightly negative. However, the gating pulse is not sufficient to cause either of the magnetic cores 4 and 6 to flip so that they return to their normal saturated flux condition.

At time T4 another gating pulse appears in the absence of an input pulse and the flux conditions of the magnetic cores 4 and 6 are temporarily increased and decreased respectively.

At time T5 a positive input pulse appears and is fed to the input windings 8 and 14 respectively. As explained above, the magnetic core 4 remains reset, but the flux of the magnetic core 6 goes slightly negative and then returns to the normal positive flux saturation condition.

At time T6 a negative input pulse appears simultaneously with a gating pulse. The presence of the gating pulse enables the negative input pulse to flip the magnetic core 4 from the reset to the set condition as is shown on line F4. The flux density of the magnetic core 4 is initially driven into a saturated condition and thereafter returns to the residual flux position until the termination of the input and gating pulses, when the magnetic core 4 resets. Therefore, the flux direction in the magnetic core 4 increases and decreases, generating a positive voltage across the output winding 12 (see line E$ij$). The reason for this is that a voltage is developed across the points $ij$ of the output winding 12 which will generate a current which in turn generates a magnetomotive force which tends to counteract the change in flux density. Since the core windings 12 and 18 are in series, a similar voltage will appear across the points $mn$ (see line E$mn$). Thereafter, as the magnetic core 4 returns to its normal reset condition, a negative voltage is developed across the points $ij$ of the output winding 12 and therefore the points $mn$ (see line E$mn$).

The rectifier 24 will pass the positive portion of the signal but block the negative portion, since the diode 26 will conduct when its cathode 30 is more negative than its anode 31. Consequently, a positive output voltage will appear (see line E*o*) at time T6 corresponding to the simultaneous presence of a negative input pulse and the gating pulse.

At time T7 a negative input pulse is fed to the magnetic gate circuit. However, since a gating pulse is not present at the same time, neither magnetic core 4 and 6 will change condition.

At time T8 a positive input pulse is fed from the input pulse source 20 to the input windings 8 and 14 simultaneously with the appearance of a gating pulse from the source 22 at the gating windings 10 and 16. The current in the input winding 8 tends to drive the flux of the magnetic core 4 in a negative direction so that the magnetic core 4 remains reset. However, the current induced in the input winding 14 drives the flux in the magnetic core 6 in a negative direction simultaneously with a similar effect produced by the gating pulse at the gating winding 16 so that the magnetic core 6 is reset (see line F6), and then set at the termination of the input and gating pulses. This change in flux direction produces a positive pulse and then a negative pulse across the output winding 18 (see line E*kl*) producing a similar voltage swing across the points *mn* (see line E*mn*). As explained above, the rectifier 24 will pass the positive pulse but block the negative pulse so that at time T8 a positive pulse will appear across the output terminals 32 and 34 (see line E*o*) corresponding to the coexistence of a positive input pulse and a gating pulse at the magnetic gate circuit.

It should be noted that when a voltage is developed across either of the output windings 12 and 18, the current induced in the other output winding produces a magnetomotive force on the associated magnetic core which tends to maintain the magnetic core in the same condition.

Thus, in accordance with the invention, a gating circuit utilizing magnetic cores has been provided which is equally responsive to both positive and negative pulses and which produces a positive pulse when an input pulse and a gating pulse are simultaneously present.

Further, inexpensive magnetic materials may be employed for the magnetic core material since generally rectangular hysteresis characteristics are not required.

There will now be obvious to those skilled in the art many modifications and variations utilizing the principles set forth and realizing many or all of the objects and advantages but which do not depart essentially from the spirit of the invention.

What is claimed is:

1. An impulse responsive unit comprising first and second magnetic binary elements, means for maintaining said first magnetic binary element is a reset state and said second magnetic binary element in a set state except during predetermined intervals, and means associated with said magnetic binary elements for changing the state of one of said magnetic binary elements in response to an impulse of predetermined polarity received during one of said predetermined intervals and the state of the other of said magnetic binary elements in response to an impulse of a polarity opposite that of said predetermined polarity received during one of said predetermined intervals.

2. An impulse responsive unit comprising first and second magnetic binary elements, means for maintaining said first magnetic binary element in a negative saturated state and said second magnetic binary element in a positive saturated state except during predetermined intervals, and means associated with said magnetic binary elements for changing the state of said first magnetic binary element in response to an impulse of negative polarity received during one of said predetermined intervals and the state of said second magnetic binary element in response to an impulse of positive polarity received during one of said predetermined intervals.

3. An impulse responsive unit comprising first and second magnetic binary elements, means for maintaining said first magnetic binary element in a reset state and said second magnetic binary element in a set state, a gating impulse source for supplying gating impulses to enable said magnetic binary elements to change state, means associated with said first magnetic binary element for changing the state of said magnetic binary element in response to an impulse of predetermined polarity and a gating impulse and for changing the state of said second magnetic binary element in response to an impulse of a polarity opposite that of said predetermined polarity and a gating impulse.

4. An impulse responsive unit comprising first and second magnetic binary elements, a gating impulse source to enable said magnetic binary elements to change state, means for always maintaining said first magnetic binary element in a saturated reset state and said second magnetic binary element in a saturated set state in the absence of gating impulses, and means associated with said first magnetic binary element for changing the state of said first magnetic binary element in response to an impulse of predetermined polarity and a gating impulse and for changing the state of said second magnetic binary element in response to an impulse of a polarity opposite that of said predetermined polarity and a gating impulse.

5. An impulse responsive unit comprising first and second magnetic binary elements, a gating impulse source, means for maintaining said first magnetic binary element in a reset state and said second magnetic binary element in a set state in the absence of gating impulses, means associated with said first magnetic binary element for changing the state of said first magnetic binary element in response to the simultaneous presence of a gating impulse and an impulse of predetermined polarity, and means associated with said second magnetic binary element for changing the state of said second magnetic binary element in response to the simultaneous presence of a gating impulse and an impulse of a polarity opposite that of said predetermined polarity.

6. A gating unit for passing positive or negative signals when gating signals are present comprising first and second magnetic binary elements, means for maintaining said first magnetic binary element in a reset state and said second magnetic binary element in a set state, and means associated with said magnetic binary elements and responsive to the gating signals for changing the state of one of said magnetic binary elements in response to a signal of predetermined polarity and the state of the other of said magnetic binary elements in response to a signal of a polarity opposite that of said predetermined polarity.

7. An impulse responsive unit comprising first and second magnetic binary elements, means for maintaining said first magnetic binary element in a saturated reset state and said second magnetic binary element in a saturated set state, means associated with said magnetic binary elements for changing the state of one of said magnetic binary elements in response to an impulse of predetermined polarity and the state of the other of said magnetic binary elements in response to an impulse of a polarity opposite that of said predetermined polarity, and means associated with said magnetic binary elements for producing an output impulse of predetermined polarity when either of said magnetic binary elements changes state.

8. An impulse responsive unit comprising first and second magnetic binary elements, a gating impulse source, means for maintaining said first magnetic binary element in a reset state and said second magnetic binary element in a set state in the absence of gating impulses, means associated with said magnetic binary elements for changing the state of one of said magnetic binary elements in response to the simultaneous presence of a gating impulse and an impulse of predetermined polarity and the state of the other of said magnetic binary elements in response to the simultaneous presence of a gating impulse and an impulse of a polarity opposite that of said predetermined polarity, and means associated with said magnetic binary elements for producing an output impulse of predetermined polarity when either of said magnetic binary elements changes state.

9. An impulse responsive unit comprising first and second magnetic binary elements, means for maintaining said first magnetic binary element in a saturated reset state and said second magnetic binary element in a saturated set state, means associated with said magnetic binary elements for changing the state of one of said magnetic binary elements in response to an impulse of positive polarity and the state of the other of said magnetic binary elements in response to an impulse of negative polarity, and means associated with said magnetic binary elements for producing an output impulse of predetermined polarity when either of said magnetic binary elements changes state.

10. An impulse responsive unit comprising first and second magnetic binary elements, means for maintaining said first magnetic binary element in a reset state and said second magnetic binary element in a set state, means associated with said magnetic binary elements for changing the state of said first magnetic binary element in response to an impulse of negative polarity and the state of said second magnetic binary element in response to an impulse of positive polarity, and means associated with said magnetic binary elements for producing an output impulse of positive polarity when either of said magnetic binary elements changes state.

11. An impulse responsive unit comprising first and second magnetic binary elements, a gating pulse source, means for maintaining said first magnetic binary element in a reset state and said second magnetic binary element in a set state, means associated with said magnetic binary elements for changing the state of said first magnetic binary element in response to a gating pulse and a pulse of negative polarity and the state of the other of said magnetic binary elements in response to a gating pulse and a pulse of positive polarity, and means associated with said magnetic binary elements for producing an output impulse of positive polarity when either of said magnetic binary elements changes state.

12. An impulse responsive unit comprising first and second magnetic binary elements, means for maintaining said first magnetic binary element in a reset state and said second magnetic binary element in a set state, means associated with said magnetic binary elements for changing the state of one of said magnetic binary elements in response to an impulse of predetermined polarity and the state of the other of said magnetic binary elements in response to an impulse of a polarity opposite that of said predetermined polarity, and rectifier means associated with said magnetic binary elements for producing an output impulse of predetermined polarity when either of said magnetic binary elements changes state.

13. Apparatus for gating input pulses by means of gating pulses and producing an output pulse during the simultaneous presence of an input pulse and a gating pulse comprising first and second magnetic cores each having an input, a gating and an output winding, said first magnetic core always being in a reset condition and said second magnetic core in a set condition in the absence of gating pulses, said gating windings being responsive to the presence of gating pulses to enable both of said magnetic cores to change condition, said input and gating windings of said first magnetic core being responsive to the simultaneous presence of an input pulse of predetermined polarity and a gating pulse respectively to change said first magnetic core to a set condition, said input and gating windings of said second magnetic core being responsive to the simultaneous presence of an input pulse of polarity opposite that of said predetermined polarity and a gating pulse respectively to change said second magnetic core to a reset condition, an output pulse appearing at the associated output winding when one of said magnetic cores changes condition.

14. Apparatus for gating both positive and negative input pulses by means of gating pulses and producing an output pulse in response to the simultaneous presence of an input pulse and a gating pulse comprising first and second magnetic cores each having an input, a gating and an output winding, said gating windings in the absence of gating pulses maintaining said first magnetic core in a reset condition and said second magnetic core in a set condition, said gating windings being responsive to the presence of gating pulses to enable said magnetic cores to change condition, said input and gating windings of said first magnetic core being responsive to the simultaneous presence of a negative pulse and a gating pulse respectively to change said first magnetic core to a set condition, said input and gating windings of said second magnetic core being responsive to the simultaneous presence of a positive pulse and a gating pulse respectively to change said second magnetic core to a reset condition, an output pulse appearing at the associated output winding when one of said magnetic cores changes condition.

15. Apparatus for gating both positive and negative input pulses by means of gating pulses and producing an output pulse during the simultaneous presence of an input pulse and a gating pulse comprising first and second magnetic cores each having an input, a gating and an output winding, said first magnetic core always being in a reset condition and said second magnetic core always being in a set condition in the absence of gating pulses, said gating windings being responsive to the presence of gating pulses to permit said magnetic cores to change condition, said input and gating windings of said first magnetic core being responsive to the simultaneous presence of a negative pulse and a gating pulse respectively to change said first magnetic core to a set condition, said input and gating windings of said second magnetic core being responsive to the simultaneous presence of a positive pulse and a gating pulse respectively to change said second magnetic core to a reset condition, an output pulse appearing at the associated output winding when one of said magnetic cores changes condition.

16. A magnetic gate circuit for gating both positive and negative input pulses by means of gating pulses and producing an output pulse during the simultaneous presence of an input pulse and a gating pulse comprising first and second magnetic cores each having an input, a gating and an output winding, said gating windings in the absence of gating pulses maintaining said first magnetic core in a reset condition and said second magnetic core in a set condition, said gating windings being responsive to the presence of gating pulses to allow said magnetic cores to change condition, said input and gating windings of said first magnetic core being responsive to the simultaneous presence of a negative pulse and a gating pulse respectively to change said first magnetic core to a set condition, said input and gating windings of said second magnetic core being responsive to the simultaneous presence of a positive pulse and a gating pulse respectively to change said second magnetic core to a reset condition, a positive output pulse and a negative output pulse appearing at the associated output winding when one of said magnetic cores changes condition, and means for selecting one of said output pulses.

References Cited in the file of this patent

UNITED STATES PATENTS

| | | |
|---|---|---|
| 2,640,164 | Giel et al. | May 26, 1953 |
| 2,654,080 | Browne | Sept. 29, 1953 |
| 2,666,161 | Rajchman | Jan. 12, 1954 |